July 10, 1951 W. D. HERSHBERGER 2,559,719

FREQUENCY-STABILIZING METHOD AND SYSTEM

Filed Sept. 25, 1948 3 Sheets-Sheet 1

INVENTOR
William D. Hershberger
BY J. L. Whittaker
ATTORNEY

FREQUENCY-STABILIZING METHOD AND SYSTEM

Filed Sept. 25, 1948 3 Sheets-Sheet 2

INVENTOR
William D. Hershberger
BY J. L. Whittaker
ATTORNEY

FREQUENCY-STABILIZING METHOD AND SYSTEM

Filed Sept. 25, 1948 3 Sheets-Sheet 3

INVENTOR
William D. Hershberger
BY J. L. Whittaker
ATTORNEY

Patented July 10, 1951

2,559,719

UNITED STATES PATENT OFFICE 2,559,719

FREQUENCY-STABILIZING METHOD AND SYSTEM

William D. Hershberger, Princeton, N. J., assignor to Radio Corporation of America, a corporation of Delaware Application September 25, 1948, Serial No. 51,253

14 Claims. (Cl. 332—19)

This invention relates to the stabilization of the mean carrier frequency of oscillators, particularly microwave oscillators, which are intermittently or periodically frequency-modulated as for transmission of television or similar signals.

Close control of the mean frequency of oscillators so modulated is not feasible with prior methods and systems because the mean frequency as measured in consecutive intervals of time is necessarily different and the mean frequency deviations measured over such intervals are consequently not an index of the correction which should be applied to maintain frequency stability in compensation for variations in supply voltages, load and other variables.

Generally in accordance with the present invention, the instantaneous frequency of the oscillator is repeatedly compared with a frequency standard, particularly the molecular resonant frequency of a gas, during successive quiescent periods of the carrier, each occurring, in television signals, in a brief interval between a line-synchronizing pulse and the preceding or following line-signal interval. Integration of the deviations so measured in rapid succession truly corresponds with departure from the desired mean frequency and consequently control in accordance therewith effects a close or rigid regulation of the oscillator.

More specifically in preferred methods and systems, during successive quiescent periods of the carrier, the frequency of a second oscillator is swept over a range including both the instantaneous frequency of the controlled oscillator and the resonant frequency of the selected gas standard. The phase or time-difference between pulses produced when the frequency of the second oscillator coincides with the molecular resonant frequency of the gas and pulses produced when the beat-frequencies of the oscillators pass through a preselected value is measured as by a phase or coincidence comparator whose output is applied to the controlled oscillator for regulation of its mean frequency.

More particularly, in some forms of the invention in which the controlled oscillator is that of a television relay station, gating pulses for periodically disabling the frequency-control are derived from the received television signal; whereas in other forms of the invention, such gating impulses may be derived from beam-deflecting pulses supplied to the camera tube or associated circuits.

The invention further resides in methods and systems having features of novelty hereinafter described and claimed.

For a more detailed understanding of the invention, reference is made to the accompanying drawings in which.

Figure 1:
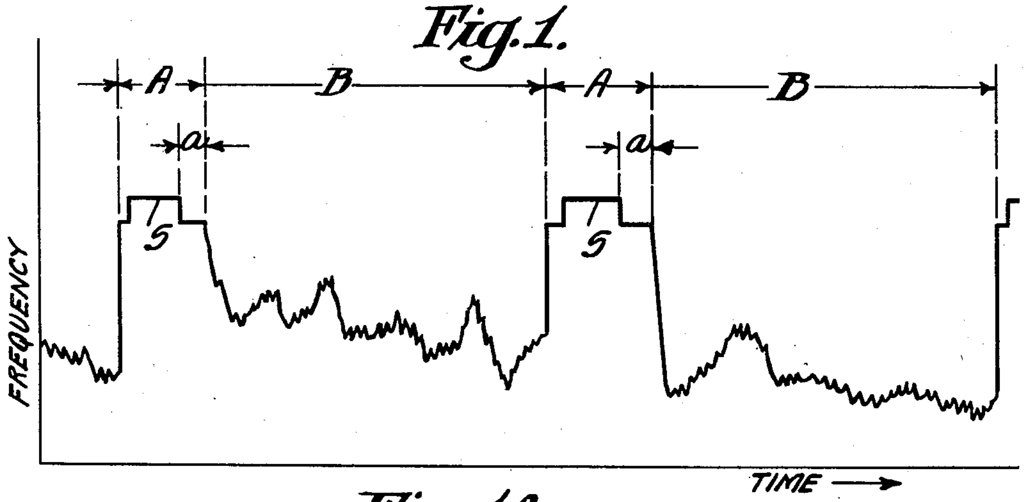
Figure 1 is an explanatory figure depicting the frequency-time characteristic of a television signal.
Figure 1A:
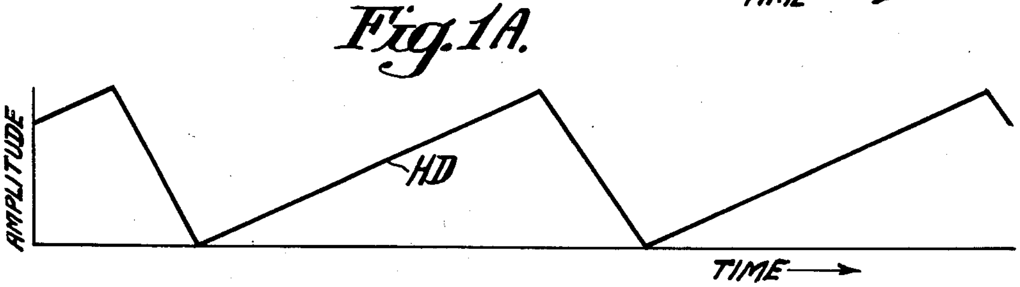
Figures 1A, 1B and 1C are explanatory figures referred to in discussion of Figure 1 or other figures.
Figure 1B:
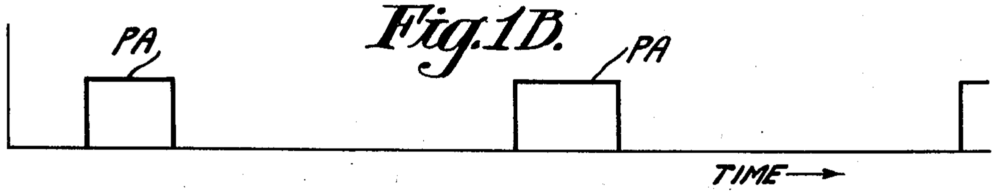
Figures 1C, 3, 5, 5A:
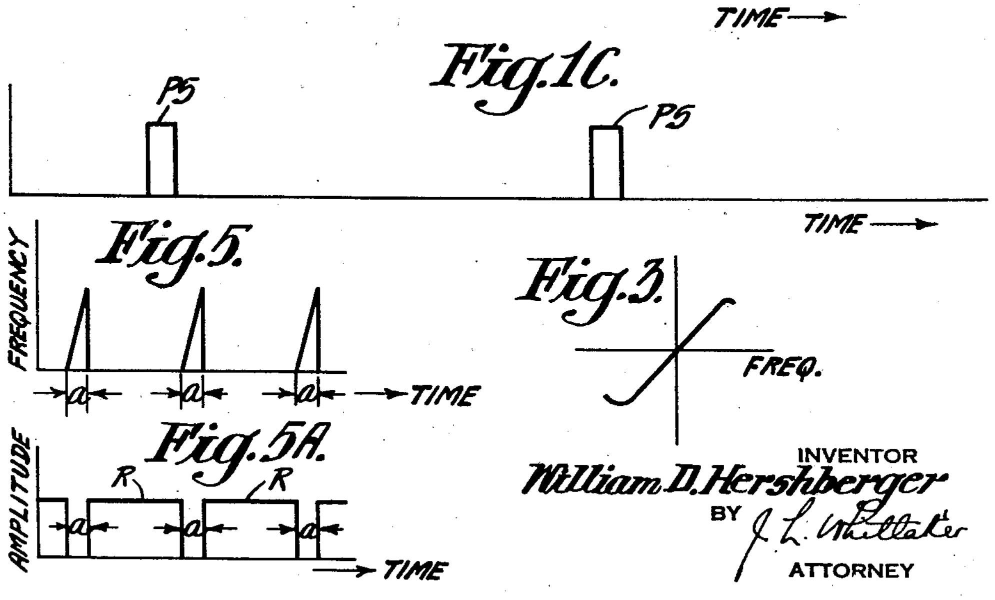
Figure 3 depicts the frequency/output characteristic of a discriminator.
Figures 2, 4, 7:
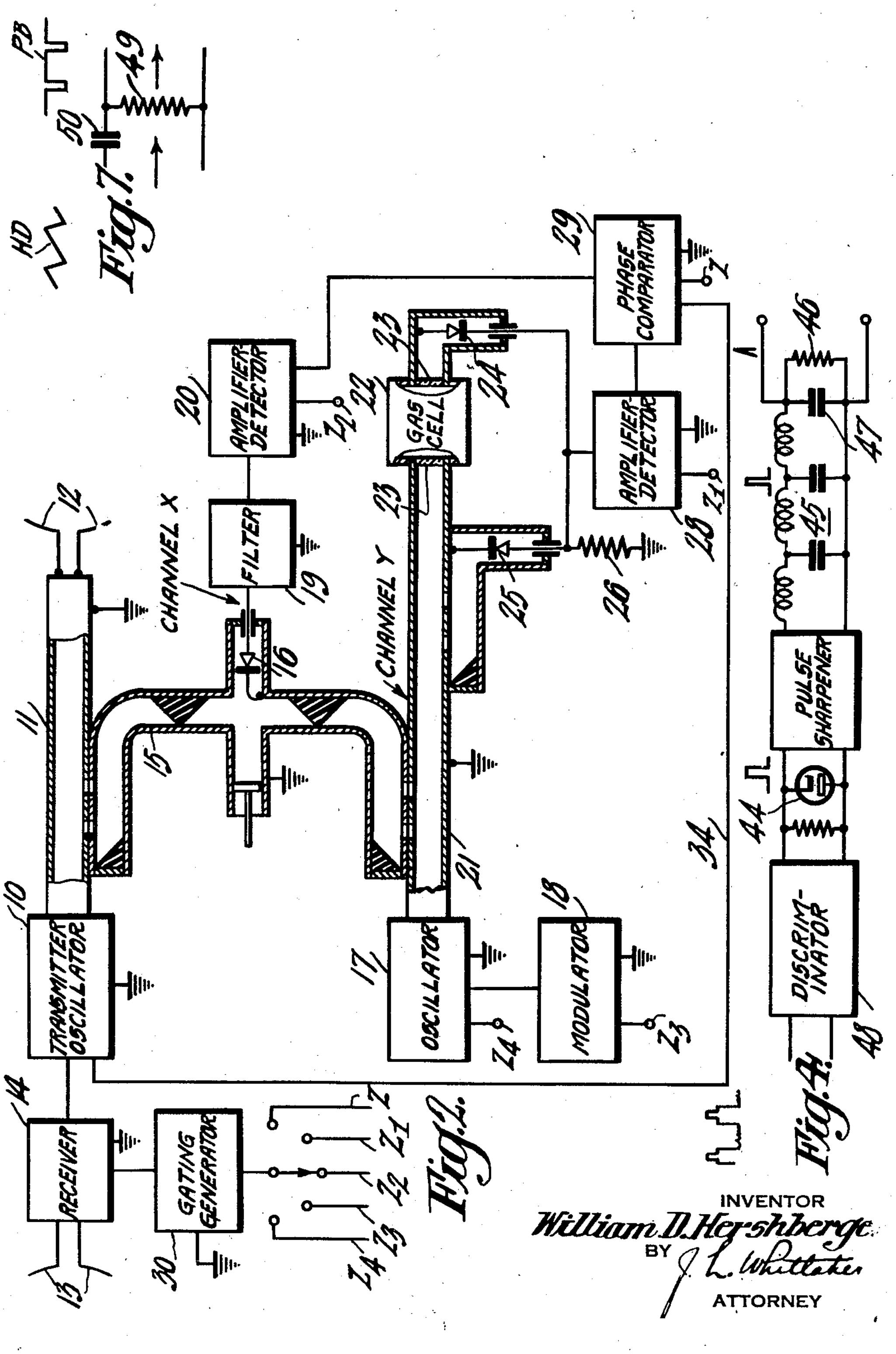
Figure 2 is a block diagram of a television repeater system incorporating the invention.
Figures 6, 8:
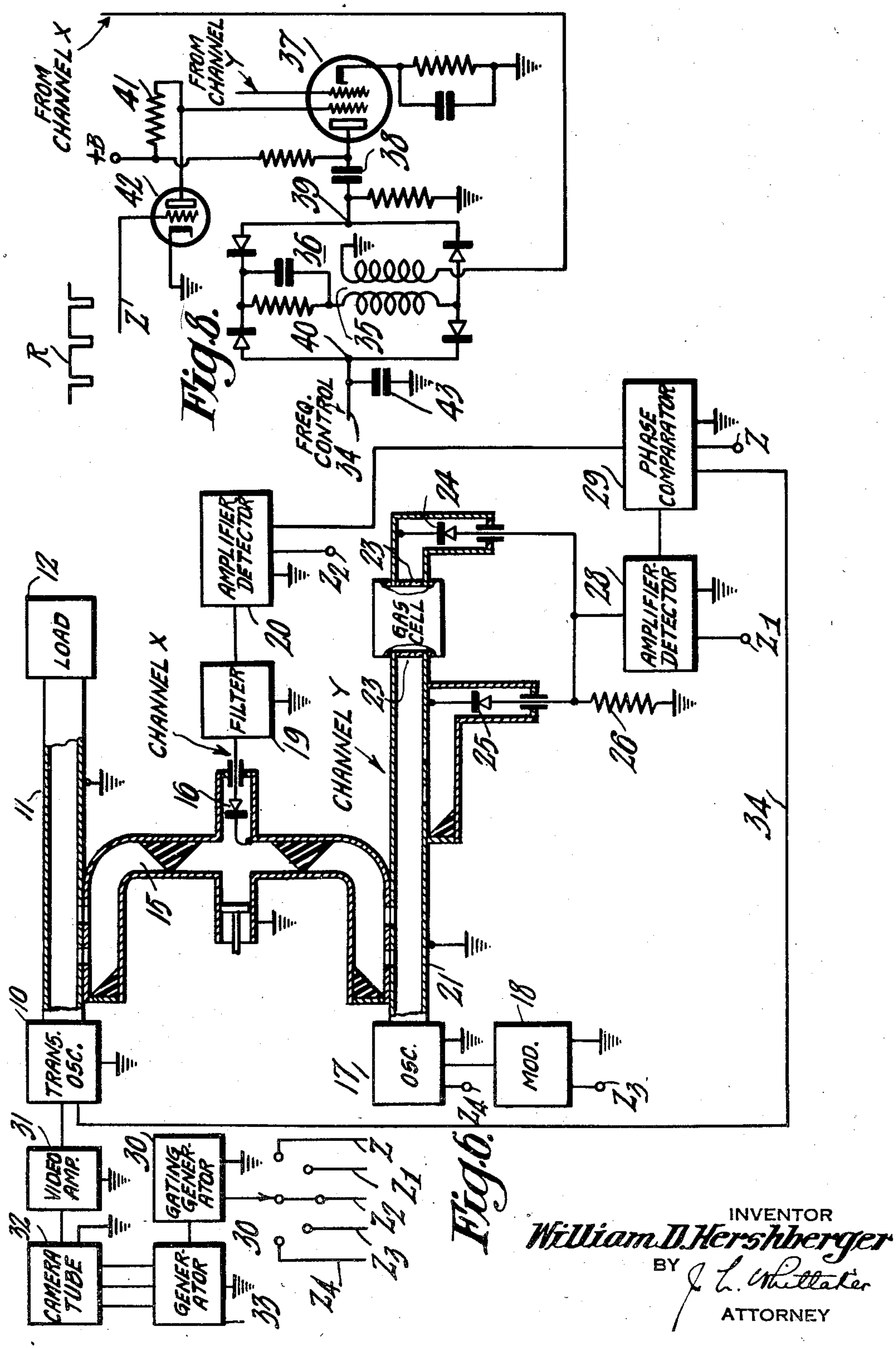

Figure 4 schematically illustrates an arrangement for deriving gating pulses from the frequency/time function shown in Figure 1;

Figures 5 and 5A are explanatory figures referred to in discussion of Figures 2 and 6;

Figure 6 is a block diagram of a television transmitter station incorporating the invention;

Figure 7 is an explanatory figure referred to in discussion of Figure 6; and

Figure 8 is a schematic diagram of a control network utilizable in the systems of Figures 2 and 6.

As shown in Figure 1, the instantaneous frequency of a television carrier is varied in each of the successive time intervals B to convey the information necessary for reproduction of the corresponding picture line. As evident from Figure 1, the mean frequency of the carrier is different in the successive time intervals B. Within the intervals A, each between adjacent intervals B, the signal includes a synchronizing pulse S. These synchronizing pulses are utilized in reproduction of the televised picture to maintain synchronism between the horizontal-deflection oscillators of the transmitter and receiver. The extent to which the carrier is modulated by these synchronizing pulses depends upon the amplitude of the pulse which may vary independently of factors causing drift or deviation of the desired mean frequency of the carrier.

As thus far described, the television signal may be characterized as having a succession of intervals in which picture information is conveyed with intervening intervals during which synchronizing information is conveyed. Measurement of the frequency of the carrier during its modulation either by the picture signals or by the synchronizing signals would not afford information useful in correcting the frequency of the oscillators for deviations due to ambient conditions such as variations in line voltage, load, ambient temperature and the like. For similar reasons, continuous measurement of the frequency of the carrier would provide no index suited for close regulation of the mean carrier frequency.

However, as shown in Figure 1, the time duration of the synchronizing pulses S need not be as great as the intervals A and accordingly during each interval A, there is a brief sub-interval $a$ during which the carrier frequency is unmodulated. To give a specific example, in television signals meeting the present standards, the line-repetition frequency is 15,750 per second so that each interval "A+B" is 63 microseconds long and the sub-interval $a$ may have a duration of the order of 6 microseconds. In accord with the present invention, during each of these brief sub-intervals $a$, the instantaneous frequency of the carrier is compared at least once with a frequency standard and the deviation so measured is a true index of the departure from the desired mean carrier frequency. These deviations measured thousands of times per second are integrated and utilized for rigid control of the mean oscillator frequency.

A preferred system for performing this method of control is a modification of the system disclosed and claimed in my copending application Serial No. 4,497, filed January 27, 1948. In brief, the carrier of the oscillator 10, frequency-modulated to convey the picture and synchronizing information, is impressed upon a transmission line 11 extending to a suitable antenna 12. In the specific arrangement shown in Figure 2, the transmitter oscillator 10 is that of a television relay station retransmitting the received signals at microwave frequencies, for example in the 6825–7125 megacycle band. The modulating signal applied to oscillator 10 for frequency-modulation of its carrier is the output of a receiver 14, upon whose input circuit is impressed television signals picked up at the same time on another carrier frequency by the antenna 13.

For stabilization of the oscillator 10, its carrier frequency, or a harmonic thereof, is also impressed as by a directional coupler 15, or equivalent, upon a demodulator, generically represented by crystal 16, upon which is also impressed the varying frequency of a second oscillator 17. The oscillator 17 is frequency-modulated by modulator 18 of any suitable type so that its frequency rapidly sweeps over a range including the frequency of oscillator 10 or the frequency of one of its harmonics. The resulting beat-frequency appearing in the output of the demodulator 16 is impressed upon a filter 19 which may be a sharp band-pass filter or low-pass filter, so that each time the beat-frequency passes through a preselected value, which may be zero, or other selected value, there is produced a pulse which, after amplification by amplifier 20, is impressed upon one input circuit of a phase-comparator 29.

The varying frequency of the second oscillator 17 is also impressed, as by the waveguide or coaxial line 21, similar to line 11, upon a cell 22 containing gas which exhibits molecular resonance at a frequency within the range swept by oscillator 17. As set forth in my aforesaid copending application, there are many gases including ammonia, which under low pressure exhibit extremely sharp molecular resonance at several discrete microwave frequencies, the sharpness of many of these resonance lines corresponding with an equivalent circuit Q of the order of 100,000. The windows 23, 23 of mica or other suitable material provide a seal confining the gas to cell 22 yet permit the passage of the microwave power. Accordingly, each time the frequency of oscillator 17 passes through the selected resonant frequency of the gas, there is a marked change in the amplitude of the energy passed by the cell to the demodulator 24. This difference in amplitude as measured by the rectifiers 24 and 25 respectively disposed beyond and in advance of the gas cell 22 provides a sharp voltage pulse across the resistor 26 or equivalent input impedance of an amplifier 28. This second series of pulses are impressed upon the other input circuit of phase comparator 29 which may be of any suitable type including that disclosed in my aforesaid copending application.

The unidirectional output voltage produced by the phase comparator in accordance with the sense and extent of the time difference between the two series of pulses respectively produced in channels X, Y is applied to oscillator 10 for variation of its frequency. As shown in my copending application, this control voltage may for example be applied to the reflector anode of a Klystron oscillator or to the frequency control grid of a magnetron. In the system of Figure 2, as thus far described, the comparison between the frequency of oscillator 10 and the resonant frequency of gas in cell 22 occurs at a rate determined by the sweep frequency of modulator 18 and accordingly the frequency-control information supplied by the phase-comparator 29 is incorrect for reasons discussed in connection with Figure 1.

To provide information truly representative of departure from the desired mean frequency of oscillator 10, the frequency-comparison information, at least as appearing in the output circuit 34 of the comparator, should be derived from the television signal only during the sub-intervals $a$. To that end, there is provided a gating generator 30 of any suitable type which derives from the received television signal as appearing at any suitable point in the circuit of receiver 14, a series of gating pulses having the same repetition rate as the signal interval "A+B" which are applied to disable the frequency control system except during the sub-intervals $a$.

Such gating pulses may, for example, be obtained by applying the frequency/time function exemplified by Figure 1 to a frequency-discriminator having a frequency/output characteristic of the nature shown in Figure 3: for examples of such discriminators reference may be had to pages 654–655 of Terman's Radio Engineering Handbook (1943 ed., McGraw-Hill). The output of the discriminator 48 is shunted by a diode 44, Figure 4, or equivalent so that the resulting waveform is a series of pulses PA, Figure 1B, having like polarity. These pulses are of width substantially corresponding with intervals A and so include the synchronizing information. The pulses PA are narrowed and delayed, as indicated by pulses PS of Figure 1C, to correspond with the sub-intervals $a$ of Figure 1. These narrowed, delayed pulses PS may be applied to modulator 18 so that the frequency of oscillator 17, as indicated in Figure 5, sweeps through the resonant gas-line at intervals $a$ during which the television carrier signal is free of picture and synchronizing information.

As indicated in Figure 4, the retarding of pulses PS may be effected by a delay line 45 having a suitable number of sections. When the modulator 18 is of type requiring a sawtooth input, the rectangular pulses PS may be converted more or less approximately to the desired sawtooth shape by terminating the delay line in a parallel CR network exemplified by resistor 46 and capacitor 47.

Instead of using a delay line, the required retarding and narrowing of the gating pulses may be obtained by recourse to the techniques and arrangements described on pages 210–217 of Richards "Radar Beacons" (1947 ed., McGraw-Hill). There are there shown various delay circuits including a blocking oscillator delay stage and a multivibrator delay stage as well as the low-pass filter type of delay network.

As generically indicated in Figure 2, the gating impulses may be applied to modulator 18 as above described or alternatively to the oscillator 17, to either of the amplifiers 20, 28 or to the phase-comparator 29 to preclude, in each case, transmission to oscillator 10 of error information based upon measurement of the frequency of oscillator 10 during its modulation by the picture or synchronizing information.

Generally the same control method and system may be used for stabilizing the frequency of a transmitter oscillator at the point of origin of the television signals. In such case as shown in Figure 6, the camera or pickup tube 32 is associated with means, generically represented by generator 33, for effecting horizontal deflections of its beam at "line" frequency, vertical deflections of its beam at "frame" frequency, for providing blanking impulses at line and frame frequencies and for providing synchronizing pulses at line and frame frequencies.

Referring to Figure 1A, the waveform HD of the voltage or current applied to effect horizontal deflection of the beam of the tube 32 at "line" frequency is generally sawtoothed as shown in Figure 1A, increasing as a linear function of time throughout each picture-line interval B and abruptly falling to minimum value during or within the succeeding interval A. The abruptly falling, trailing ends of the sawtooth wave HD may be used, as well known in the art, to provide pulses having the same repetition frequency and of suitable shape. For example, the sawtooth wave HD may be impressed upon a differentiating circuit, exemplified in Figure 7, by resistor 49 and capacitor 50, to produce pulses PB which may be narrowed and retarded as discussed in connection with Figure 4 to provide gating pulses PS of proper width, phasing and repetition rate.

Using such technique, the gating generator 30 may derive from the sawtooth wave HD a series of pulses PS which may be applied to oscillator 17 or its modulator 18 to cause the oscillator frequency, generally as shown in Figure 5, rapidly to sweep the frequency of oscillator 17 over a range including the resonant frequency of gas cell 22 and the operating frequency of oscillator 10. Thus in each interval "A + B," Figure 1, but only during the sub-interval *a*, thereof, the frequency-control system is effective to compare the frequency or oscillator 10 with the standard frequency for production of an error-voltage by the phase-comparator 29 or equivalent.

Alternatively, a sawtooth wave similar to HD, Figure 1A, may be derived by triggering a sawtooth generator in synchronism with the "line" frequency generator and from these sawtooth waves may be derived pulses of the same repetition rate for disabling the frequency-control except during sub-interval *a*.

Reverting to Figure 6, the generator 33 also includes a multi-vibrator (not shown) or the like for producing the line-synchronizing pulses S, Figure 1B. The gating generator 30 may comprise a multi-vibrator controlled by these pulses S to produce a rectangular wave R, Figure 5A, which may be applied to either or both of the amplifiers 20, 28 to block them and so prevent passage to the comparator 29 of the pulses in channels X and Y except during the sub-interval *a*. In such event, the oscillator 17 and its modulating oscillator 18 may operate continuously but the frequency-comparison is made only during the sub-intervals *a*.

When the phase-comparator 29, Figures 2 and 6, is of the type shown in my aforesaid application, the gating impulses of Figure 5A may be employed to prevent frequency comparison except during sub-intervals *a* by a modification of the comparator shown in Figure 8. Specifically, the pulses from channel X are impressed by transformer 35 upon one conjugate arm of a rectifier bridge or balanced modulator 36. The pulses from channel Y are impressed upon the control grid of a tube 37 whose anode is coupled by blocking condenser 38 to the point 39 between one pair of oppositely poled rectifiers. During normal operation of the phase-comparator, the two series of pulses are converted by the bridge network 36, generally as explained in my aforesaid application, to produce between point 40 and ground or equivalent return conductor a unidirectional voltage whose magnitude varies with change in the time relations of the two series of pulses. To disable the phase-comparator except during the sub-interval *a*, the potential of the screen grid of tube 37 is controlled by a potential-dividing network including the series resistor 41 and a control tube 42. The gating impulses R, Figure 5A, are applied to the control grid of the tube 42 so that except during the sub-intervals *a*, the potential of the screen of tube 37 is too low to effect transfer to the rectifier network 36 of the pulses from channel Y and consequently the charge on the integrating condenser 43 connected between point 40 and ground is varied only during the sub-intervals *a*.

From the foregoing explanation and specific examples, other systems and arrangements, within the scope of the appended claims, for effecting frequency control of a frequency-modulated oscillator only during quiescent periods of the carrier should be evident to those skilled in the art.

What is claimed is:

1. A system for stabilizing the mean carrier frequency of an oscillator intermittently frequency-modulated by signals for transmission of information comprising a cell containing gas exhibiting molecular resonance, frequency-control means for said oscillator including means for comparing its instantaneous frequency with the molecular resonance frequency of said gas, and means actuated by said signals for disabling said frequency-comparison means.

2. A system for stabilizing the mean carrier frequency of an oscillator frequency-modulated at periodic intervals by signals for transmission of information comprising a generator producing gating pulses having the same repetition rate as said intervals, a cell containing gas exhibiting molecular resonance, frequency-control means for said oscillator including means for comparing its instantaneous frequency with the molecular resonance frequency of said gas, and control means applying said gating pulses for operation of said frequency-comparison means only during absence of said signals.

3. A system for stabilizing the mean carrier frequency of an oscillator frequency-modulated by video signals and synchronizing pulses which comprises a cell containing gas exhibiting molecular resonance, frequency-control means for said oscillator including means for comparing the instantaneous frequency of said oscillator with the molecular resonance frequency, and means controlled by said synchronizing pulses to disable said frequency-control means during modulation of said oscillator by said signals or pulses.

4. A system for stabilizing the mean carrier frequency of an oscillator frequency-modulated by video signals and synchronizing pulses which comprises a cell containing gas exhibiting molecular resonance, means including a second oscillator for producing oscillations varying over a range including the molecular resonance frequency, electrical filter means, frequency-control means including means for comparing the time difference between two series of pulses respectively passed by said gas cell and said filter means, and means including a gating generator operating in synchronism with said synchronizing pulses for disabling said frequency-control means during modulation of the carrier by the video signals and synchronizing pulses.

5. A system for stabilizing the mean carrier frequency of the transmitter oscillator of a television relay station comprising a cell containing gas exhibiting molecular resonance, frequency-control means for said oscillator including means for comparing its instantaneous frequency with the molecular resonance frequency of said gas, and a gating generator controlled by the television carrier received at said station for disabling said frequency-control means when said received carrier is modulated.

6. A system for stabilizing a mean frequency of the transmitter oscillator modulated by signals from a camera tube comprising a cell containing gas exhibiting molecular resonance, frequency-control means for said oscillator including means for comparing its instantaneous frequency with the molecular resonance frequency of said gas, and a gating generator operating in synchronism with beam-control pulses periodically impressed on said camera tube to disable said frequency-control means during modulation periods of said oscillator.

7. The method of utilizing a gas exhibiting molecular resonance for stabilizing the mean carrier frequency of frequency-modulated signals which comprises comparing the instantaneous frequency of said signals with a molecular resonance frequency of said gas only during quiescent periods of the carrier of said signals, and controlling the frequency of said signals in accordance with deviations from a preselected relation of said instantaneous and molecular resonance frequencies.

8. The method of utilizing a gas exhibiting molecular resonance for stabilizing the mean frequency of signals whose carrier is intermittently frequency-modulated for transmission of intelligence which comprises between modulating intervals of the carrier comparing its instantaneous frequency with a molecular resonance frequency of said gas, producing a control voltage varying in accordance with the extent and sense of deviation from a preselected relation of the compared frequencies, and applying said control voltage to compensate for deviations from the desired mean frequency.

9. The method of utilizing a gas exhibiting molecular resonance for stabilizing the mean carrier frequency of signals frequency-modulated by picture and picture-synchronizing signals which comprises at periodic intervals corresponding with absence of said modulating signals comparing the instantaneous carrier frequency with a molecular resonance frequency of said gas, and controlling the mean carrier frequency of said signals in accordance with deviations from a preselected relation of said compared frequencies.

10. The method of utilizing a gas exhibiting molecular resonance for stabilizing the mean carrier frequency of signals derived from a television repeater station which comprises deriving from the received signal a series of control pulses having the same repetition rate as the line frequency of the received picture information, applying said control pulses for periodic comparison of the instantaneous frequency of said mean carrier frequency signals with a molecular resonance frequency of said gas only at intervals during which the carrier is free of picture or synchronizing information, and controlling the frequency of said mean carrier signals in accordance with deviations from a selected relation of the frequencies so compared.

11. The method of utilizing a gas exhibiting molecular resonance for stabilizing the mean carrier frequency of signals frequency-modulated by signals from a camera tube and from a synchronizing-pulse generator which comprises producing gating pulses having the same repetition rate as the synchronizing pulses, applying said gating pulses for comparison of the instantaneous frequency of said mean carrier signals with a molecular resonance frequency of said gas at spaced intervals having aforesaid repetition rate and during which the carrier signal is unmodulated, and controlling the mean carrier frequency in accordance with deviations from a selected relation of the frequencies so compared.

12. The method of utilizing a gas exhibiting molecular resonance for stabilizing the mean frequency of first signals whose carrier is frequency-modulated for transmission of information which comprises generating second signals, repeatedly varying the frequency of said second signals over a range of frequencies including a molecular resonance frequency of said gas, repeatedly impressing said second signals upon said gas to produce a series of pulses, producing a second series of pulses each occurring as the difference between the frequencies of said signals passes through a preselected value, comparing the time-difference between pulses of said two series only during quiescent periods of the carrier, and controlling the frequency of the first signals in accordance with variations of said time-difference.

13. The method of utilizing a gas exhibiting molecular resonance for stabilizing the mean frequency of first signals frequency-modulated by video signals and synchronizing pulses which comprises generating second signals, repeatedly varying the frequency of said second signals at the repetition rate of said pulses over a range of frequencies including a molecular resonance frequency of said gas and during absence of said video signals, impressing said range of frequencies upon said gas to produce a series of pulses each occurring as the frequency of said second signals passes through said molecular resonance frequency, producing a second series of pulses as the difference of said first and second signal frequencies passes through a preselected value, comparing the time-difference between the pulses of said series, and controlling the frequency of the first signals in accordance with variations of said time-difference.

14. The method of utilizing a gas exhibiting molecular resonance for stabilizing the mean frequency of first signals frequency-modulated by video signals and synchronizing pulses which comprises generating second signals, continuously repeatedly varying the frequency of said second signals over a range of frequencies including a molecular resonance frequency of said gas, impressing said range of frequencies upon said gas to produce pulses at each coincidence of said molecular resonance frequency with the frequency of said second signals, producing a second series of pulses each occurring upon coincidence of the difference of said first and second signal frequencies with a preselected value, comparing the time-difference between the pulses of said series at spaced intervals having the same repetition rate at said synchronizing pulses and characterized by absence of video signals, and controlling the frequency of said first signals in accordance with variations of said time-difference.

WILLIAM D. HERSHBERGER.

REFERENCES CITED

The following references are of record in the file of this patent:

UNITED STATES PATENTS

| Number | Name | Date |
|---|---|---|
| 2,279,659 | Crosby | Apr. 14, 1942 |
| 2,296,919 | Goldstine | Sept. 29, 1942 |
| 2,299,945 | Wendt | Oct. 27, 1942 |
| 2,462,841 | Bruck et al. | Mar. 1, 1949 |
| 2,475,074 | Bradley et al. | July 5, 1949 |
| 2,501,368 | White | Mar. 21, 1950 |